US012695250B2

(12) United States Patent
Luellich

(10) Patent No.: US 12,695,250 B2
(45) Date of Patent: Jul. 28, 2026

(54) SHIELDED ELECTRICAL ASSEMBLY CONNECTOR FOR AN ASSEMBLY OF A VEHICLE

(71) Applicant: TE Connectivity Germany GmbH, Bensheim (DE)

(72) Inventor: Eike Luellich, Bensheim (DE)

(73) Assignee: TE CONNECTIVITY SOLUTIONS GMBH, Schaffhausen (CH)

( * ) Notice: Subject to any disclaimer, the term of this patent is extended or adjusted under 35 U.S.C. 154(b) by 243 days.

(21) Appl. No.: 18/497,048

(22) Filed: Oct. 30, 2023

(65) Prior Publication Data

US 2024/0154368 A1 May 9, 2024

(51) Int. Cl.
*H01R 13/6581* (2011.01)
*H01R 13/6596* (2011.01)

(52) U.S. Cl.
CPC ..... *H01R 13/6581* (2013.01); *H01R 13/6596* (2013.01); *H01R 2201/26* (2013.01)

(58) Field of Classification Search
CPC ............ H01R 13/6581; H01R 13/6596; H01R 2201/26
See application file for complete search history.

(56) References Cited

U.S. PATENT DOCUMENTS

2011/0095563 A1 4/2011 Andersen
2020/0144771 A1 5/2020 Zhang

FOREIGN PATENT DOCUMENTS

EP 2557022 B1 2/2013
GB 2362360 A 11/2001
JP 2013545232 A 12/2013
JP 2015207399 A 11/2015
KR 20130103563 A 9/2013
WO 2012056325 A1 5/2012
WO WO-2015071172 A1 * 5/2015 ......... H01R 13/5202
WO 2018230538 A1 12/2018
WO 2019108236 A1 6/2019

OTHER PUBLICATIONS

English translation of WO 2015/071172 A1. (Year: 2021).*
Office Action for corresponding KR Application No. 2024111387913 dated Dec. 24, 2024 (6 pages).

(Continued)

*Primary Examiner* — Sean Gugger
(74) *Attorney, Agent, or Firm* — Jay J. Hoette; Carroll, Hoette & Butscher, LLC

(57) ABSTRACT

An electrical high-current and/or high-voltage assembly connector for an assembly of a vehicle, particularly an electrical energy storage device of an electric vehicle, the assembly connector on the one hand being structured in such a manner that it can be or is installed on and in an assembly wall; and the assembly connector on the other hand being formed in such a manner that in the installed state on and in the assembly wall, a connector shield of the assembly connector is electrically conductively connected to the assembly wall, and the electrically conductive connection of the connector shield to an electrically conductive layer of the assembly wall takes place by means of an electrically conductive shield contact adapter of the assembly connector.

20 Claims, 4 Drawing Sheets

(56) References Cited

OTHER PUBLICATIONS

Second Office Action for corresponding JP Application No. 2023-186055 dated Jun. 10, 2025 (12 pages).
Office Action for corresponding JP Application No. 2023186055 dated Jan. 22, 2025 (12 pages).
Search Report for corresponding DE Application No. 102022129113.8 dated Jun. 30, 2023 (6 pages).
Office Action in corresponding IN Application No. 202344074146, dated Apr. 24, 2026, (6 pages).

* cited by examiner

SHIELDED ELECTRICAL ASSEMBLY CONNECTOR FOR AN ASSEMBLY OF A VEHICLE

CROSS REFERENCE TO RELATED APPLICATIONS

This application claims the benefit of DE Application No. 102022129113.8 filed 3 Nov. 2022, the subject matter of which is herein incorporated by reference in its entirety.

BACKGROUND OF THE INVENTION

The subject matter herein relates to an electrical high-current and/or high-voltage assembly connector for an assembly of a vehicle, such as a power-electrical assembly for a vehicle.

In the electrical sector (electrics, electrical engineering, electrical power engineering etc.) beyond ground-based electrical power engineering and its analogues, a large number of electrical connectors are known which serve the purpose of transmitting electrical currents and voltages in the high-current and/or high-voltage range. In this case, the connectors, for example for a supply and/or a distribution of electrical energy in warm, possibly hot, contaminated, humid and/or chemically aggressive environments, in the short term and/or permanently ensure problem-free transmission of electrical energy. Owing to a wide range of applications, a large number of such line connectors are known in the non-automotive sector and in the automotive sector.

Such electrical high-current and/or high-voltage connectors can be installed, for example, on/in a power-electrical assembly, for example a (traction) battery or a battery module, an inverter, a switchgear assembly etc. —High fuel costs and efforts to reduce environmental impacts make, for example in the automotive sector, hybrid or electric vehicles necessary. One aspect of these vehicles is handling of high electrical charging and/or operating currents and/or voltages, wherein relevant components of the assemblies of the vehicles must be designed correspondingly. This relates for example to high-current lines or high-voltage lines (e.g., a stranded line, conductor bar, busbar, etc. consisting of copper or aluminum) and contact devices (e.g., terminal fitting, flat contact, busbar etc. consisting of copper or aluminum) of the connectors.

For internally electrically contacting an electrical high-current and/or high-voltage connector of a power-electrical assembly, power-electromechanical screw contact connections can be used, which also meet stringent requirements. A mechanical path can be functionally separated from an electrical path by means of such a high-current and/or high-voltage screw contact connection. The mechanical path serves to transmit the mechanical tensile stresses of a screw fitting, in particular a steel-steel screw fitting, and the electrical path is used as a low-resistance electrical contact connection, in particular a copper-copper connection, of the screw contact connection.

As a result, a robust and, in the typical manufacturing environment, easily handleable electrical high-current and/or high-voltage screw contact connection is provided. In addition, such a screw contact connection is easily separable (diagnosis, recycling) and at the same time safe to touch. Such screw contact connections can be used in a variety of ways and flexibly for making contact with battery modules and for other connection points in various termination panels of an electrical power architecture.—Efforts are continually being made to improve electrical high-current and/or high-voltage connectors, in particular to design them to be more effective and to make them cost-effective in the process.

There is a need for an improved electrical high-current and/or high-voltage connector for an assembly of a vehicle, such as for an electric vehicle.

BRIEF DESCRIPTION OF THE INVENTION

In one embodiment, an electrical high-current and/or high-voltage assembly connector (below merely: assembly connector) is provided for an assembly of a vehicle, such as an electrical energy storage device of an electric vehicle. In another embodiment, a power-electrical assembly for a vehicle, particularly an electrical energy storage device for an electric vehicle, is provided including an assembly connector. In a further embodiment, a vehicle, particularly an electric vehicle, is provided including an assembly connector. Advantageous developments, additional features and/or advantages of the subject matter herein can be gleaned from the claims and the following description.

In a further embodiment, an electrical assembly connector is provided for an assembly of a vehicle. The electrical assembly connector includes a housing having a contact receptacle. The housing is configured to be received in a connector through-cut in an assembly wall of the assembly. The housing has an inner section arranged at an inner side of the assembly wall and an outer section arranged at an outer side of the assembly wall. A contact is held in the contact receptacle of the housing. A connector shield is coupled to the housing and surrounding at least part of the contact receptacle, the connector shield being electrically conductive. A shield contact adapter is coupled to the housing. The shield contact adapter is electrically connected to the connector shield. The shield contact adapter has a connection configured to form an electrically conductive connection with an electrically conductive layer of the assembly wall such that the shield contact adapter electrically connects the connector shield to the electrically conductive layer of the assembly wall.

In an embodiment, an assembly connector, which is formed e.g., as a header, is on the one hand structured in such a manner that it can be or is installed on and in an assembly wall. On the other hand, the assembly connector is formed in such a manner that in the installed state on and in the assembly wall, a connector shield of the assembly connector is electrically conductively connected to the assembly wall, wherein the electrically conductive connection of the connector shield to an electrically conductive layer of the assembly wall takes place by means of an electrically conductive shield contact adapter of the assembly connector.

That is to say that the electrically conductive connection of the shield to the assembly wall does not take place directly, but rather indirectly via the shield contact adapter. And it should of course be clear from the term ‘adapter’ that this is an intentional, predetermined physical configuration of a component and not a shape which is assumed owing to real-world conditions, such as e.g., that of a coating or its analogues.

The electrically conductive connection of the connector shield to the electrically conductive layer of the assembly wall in the installed state of the assembly connector on and in the assembly wall may on the one hand be formed as a direct electrical contact of the connector shield with the shield contact adapter and/or may on the other hand be formed as a direct or indirect electrical contact of the shield contact adapter with the electrically conductive layer of the assembly wall.

The direct electrical contact of the connector shield with the shield contact adapter may be formed as an electrical plugin connection, an electrical contact connection and/or an electrical spring connection. Here, at least one contact partner of the electrical contact may be formed as an electrical spring contact. Furthermore, the direct electrical contact can be produced by means of an electrical contact lug of the connector shield or the shield contact adapter. Furthermore, the direct electrical contact can be produced by means of a spring contact lug of the connector shield and a radial inner side or outer side of the connector shield The direct electrical contact of the shield contact adapter with the electrically conductive layer of the assembly wall can be produced by means of coating opening devices on the shield contact adapter. Such coating opening devices may be e.g., cutting devices, tearing devices or breaking devices, such as e.g., blades, edges, corrugations, shoulders, etc., by means of which a coating of the assembly wall can be opened as far as its electrically conductive layer. Alternatively or additionally, the direct electrical contact of the shield contact adapter with the electrically conductive layer of the assembly wall can be formed as an electrical plugin connection, an electrical surface connection and/or an electrical press-fit connection.

The indirect electrical contact of the shield contact adapter with the electrically conductive layer of the assembly wall can be produced by means of a fastening means, which fastens the shield contact adapter to the assembly wall.

For the electrically conductive connection of the connector shield via the shield contact adapter to the electrically conductive layer of the assembly wall in the installed state of the assembly connector on and in the assembly wall, a substantially peripheral electrical peripheral contact can be formed in the peripheral direction of the assembly connector between the connector shield and the shield contact adapter, wherein the peripheral contact is preferably formed as an intermittent electrical contact with a multiplicity of individual electrical contacts.

For the electrically conductive connection of the connector shield via the shield contact adapter to the electrically conductive layer of the assembly wall in the installed state of the assembly connector on and in the assembly wall, electrical axial contacts can be arranged between the shield contact adapter and the electrically conductive layer of the assembly wall in the axial direction of the assembly connector, wherein the axial contacts are preferably formed as a multiplicity of axial pressing areas (points, sections) and/or as a plurality of hollow cylindrical contacts (flat, corrugated or serrated boundary surfaces) running in the axial direction.—Here (cf. also above), a plurality is preferably smaller than a multiplicity.

In the installed state of the assembly connector on and in the assembly wall, the shield contact adapter can be mounted on an inner side of the assembly wall. That is to say, the shield contact adapter is or can be installed internally in the assembly. Furthermore, in the installed state, a section of the assembly connector on the inner side of the assembly can extend through the shield contact adapter or a section of the assembly connector on the inner side of the assembly can be arranged in the shield contact adapter at least in axial sections. Furthermore, in the installed state, a section of the assembly connector on the outer side of the assembly can be mounted on an outer side of the assembly wall.

If the shield contact adapter is rather formed as a ring-shaped shield contact adapter (cf. below), then the section on the inner side of the assembly may extend through the connection through-cutout. And if the shield contact adapter is rather formed as an apron-like shield contact adapter (cf. likewise below), then the section on the inner side of the assembly may extend through the connection through-cutout or be arranged in the connection through-cutout at least in axial sections.

The shield contact adapter may comprise a—base, via which the shield contact adapter can be or is fastened on the assembly wall. Furthermore, the shield contact adapter can be formed as a ring-shaped or apron-like shield contact adapter which is substantially closed in the peripheral direction. Furthermore, the shield contact adapter may comprise a connection through-cutout, in which the section of the assembly connector on the inner side of the assembly can be or is arranged.

The shield contact adapter may comprise a centering ring, which projects in the axial direction, for arranging the shield contact adapter in a connector through-cutout in the assembly wall. Furthermore, the shield contact adapter may comprise a peripheral wall, which projects in the axial direction and is completely peripheral and closed for preventing the penetration of a liquid into the interior of the shield contact adapter. The centering ring and the peripheral wall can be arranged in the shield contact adapter flush in the axial direction. Furthermore, the peripheral wall may comprise a greater extent in the axial direction than the centering ring.

In the installed state of the assembly connector on and in the assembly wall, the shield contact adapter can be fastened to the assembly wall by means of a fastening means. In particular, the fastening means can be formed as a screw or a rivet, particularly an SPR rivet (self-piercing rivet). The fastening means can in this case penetrate the assembly wall and be securely arranged in a housing of the assembly connector. The housing can be formed as an outer housing of the section of the assembly connector on the outer side of the assembly.

In the installed state of the assembly connector on and in the assembly wall, the shield contact adapter can be arranged around the connector through-cutout in a liquid-tight manner with respect to the assembly wall. This may take place by pressing the shield contact adapter onto the assembly wall. Furthermore, a sealing material, a seal, etc. may alternatively or additionally be used.

The shield contact adapter can be formed as a shield contact adapter of a multipolar, particularly a bipolar, assembly connector. Furthermore, the shield contact adapter may, for each contact of the assembly connector, comprise an elongate receiving area for the contact. Furthermore, in a cross section of the connection through-cutout, receiving areas for the contact, which are directly adjacent to one another, may comprise a constriction between them.

The shield contact adapter is preferably formed as a three-dimensionally structured component. Furthermore, the shield contact adapter can be formed as a shield contact adapter which can be mounted and demounted again. Furthermore, the shield contact adapter can be formed as a diecast part, particularly an aluminum diecast part, a deep-drawn part or formed by a different method.

The assembly connector is preferably formed as an assembly connector device. Furthermore, the electrically conductive layer of the assembly wall may comprise a coating of the assembly wall. Here, the coating may be configured to be electrically conductive or electrically non-conductive. The coating may be configured as a vehicle floor coating and in particular as a CDC coating (CDC: cathodic dip coating). Furthermore, the assembly wall can be formed as an assembly base wall.

In a further embodiment, a power-electrical assembly is provided, particularly the electrical energy storage device, including an assembly connector on and in an assembly wall of the assembly. An assembly of this type can e.g., further be formed as an electric motor, an electric traction motor, an inverter, a switchgear assembly, etc., particularly for a vehicle. Furthermore, the energy storage device can be formed as a (traction) battery, a rechargeable battery, etc. Furthermore, the assembly can be used for example where walls made from sheet metal and/or aluminum diecast parts can be used.

In another embodiment, a vehicle is provided including a power-electrical assembly. A vehicle is preferably understood to mean a motor vehicle and in particular a road vehicle, but may also be understood to mean a rail vehicle, a watercraft and/or an aircraft. Furthermore, an electric vehicle is understood to mean a vehicle with an electric traction motor, which in addition to its electric traction motor may comprise a further nonelectric drive, such as e.g., an internal combustion engine. In other words, a vehicle with an electric traction motor can be understood to mean, for example, a hybrid electric vehicle, an electric vehicle (electromotive drive only), a fuel cell vehicle, etc.

The subject matter herein is explained in greater detail below on the basis of exemplary embodiments with reference to the appended schematic drawings which are not to scale. Sections, elements, component parts, units, components and/or patterns which have an identical, unique or analogous configuration and/or function are identified by the same reference symbols in the description of the figures (see below), the list of reference symbols, the patent claims and in the figures (Figs) of the drawings. A possible alternative which is not explained in the description of the invention (see above), is not illustrated in the drawings and/or is not definitive, a static and/or kinematic reversal, a combination etc. with respect to the exemplary embodiments of the invention or a component, a pattern, a unit, a component part, an element or a section thereof, can further be gleaned from the list of reference symbols and/or the description of the figures.

In the case of the invention, a feature (portion, element, component part, unit, component, function, variable etc.) can be of positive configuration, that is to say present, or of negative configuration, that is to say absent. In this specification (description (description of the invention (see above), description of the figures (see below)), list of reference symbols, patent claims, drawings), a negative feature is not explained explicitly as a feature if value is not placed on it being absent according to the invention. That is to say, the invention which is actually made and is not constructed by way of the prior art consists in omitting the said feature.

A feature of this specification can be used not only in a specified manner and/or way, but rather also in another manner and/or way (isolation, combination, replacement, addition, on its own, omission, etc.). In particular, it is possible, in the description, the list of reference symbols, the patent claims and/or the drawings, to replace, add or omit a feature in the patent claims and/or the description on the basis of a reference symbol and a feature which is assigned to it, or vice versa. Furthermore, a feature in a patent claim can be interpreted and/or specified in greater detail as a result.

The features of the description can also be interpreted as optional features (in view of the (initially mostly unknown) prior art); that is to say, each feature can be considered to be an optional, arbitrary or preferred feature, that is to say a feature which is not mandatory. Therefore, a separation of a feature, possibly including its periphery, from an exemplary embodiment is possible, it then being possible for the said feature to be transferred to a generalized inventive concept. The absence of a feature (negative feature) in an exemplary embodiment shows that the feature is optional in relation to the invention. In addition, in the case of a type term for a feature, a generic term for the feature can also be implicitly understood (possibly further hierarchical breakdown into subgenus, etc.), as a result of which a generalization of the feature is possible, for example with consideration of equivalent effect and/or equivalence.

DETAILED DESCRIPTION OF THE INVENTION

Figure 7:
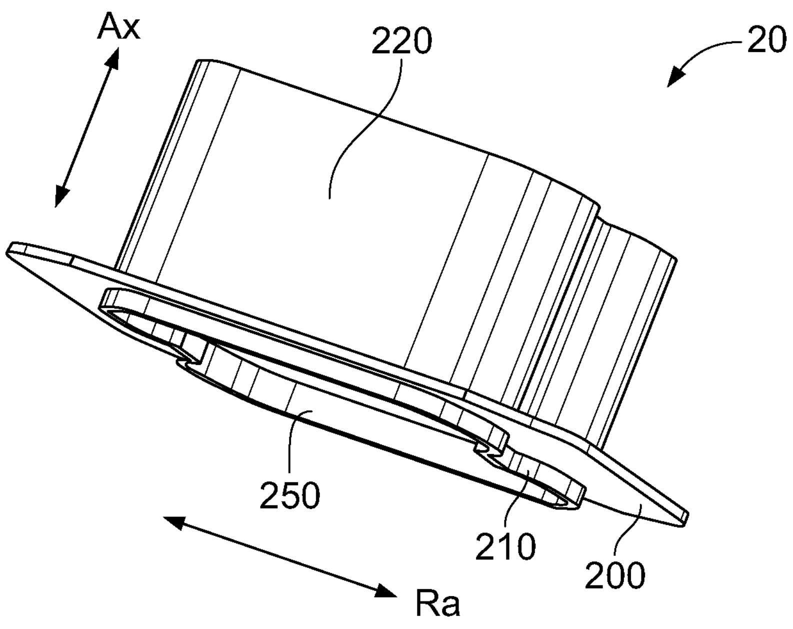
FIG. 7 shows an apron-like shield contact adapter for the assembly connector in perspective views, alone in each case in accordance with an exemplary embodiment.
Figure 8:
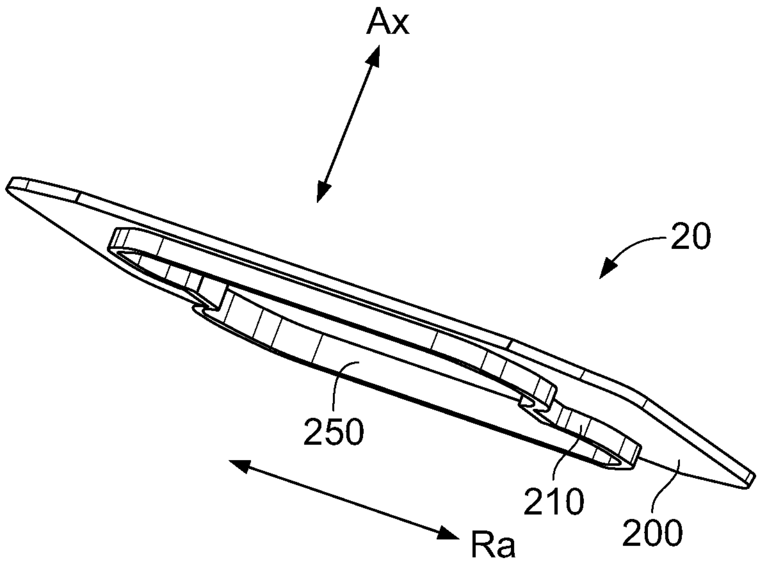
FIG. 8 shows a ring-shaped shield contact adapter for the assembly connector in perspective views, alone in each case in accordance with an exemplary embodiment.

Embodiments are explained in more detail in the following with reference to exemplary embodiments of three embodiments (e.g., illustrated in FIGS. 5, 7 and 8) of a variant of an electrical high-current and/or high-voltage assembly connector 1, which is formed as a header 1 (only termed assembly connector 1 in the following) including a shield contact adapter 20 for the connector 1, which may be used for an assembly 0 of a vehicle. In various embodiments, the assembly 0 may be an electrical energy storage device 0 of an electric vehicle.

The connector 1 can be used in general in the electrical sector for an electrical assembly. One exception is formed here by terrestrial electrical power engineering and analogues. Moreover, although the subject matter is described and illustrated further in greater detail by way of preferred exemplary embodiments, the invention is not restricted by the disclosed exemplary embodiments, but rather is of more fundamental nature. Other variations can be derived therefrom and/or from the above (description of the invention) without departing from the scope of protection of the invention.

The drawings show only those physical sections of a subject matter which are necessary for understanding the invention. Designations such as connector and mating connector, contact means and mating contact means, etc. are to be interpreted synonymously, that is to say they are possibly interchangeable in each case. In the following, the explanation of the subject matter with reference to the drawing relates to an axial direction Ax, a radial direction Ra, and a peripheral direction Um of the assembly connector 1 and the shield contact adapter 20 thereof.

A floor panel (for example, an assembly wall 5) of a vehicle is protected with a coating, often a CDC coating, from stone impact, which makes an electrical shield contact of the floor panel considerably more difficult in the case of an electrical connector (for example, the assembly connector 1 in the following) on/in the floor panel. In order to solve this problem, masking of the subfloor panel may be used for the coating. Such masking is expensive, however, and leads to corrosion problems of the subfloor panel.

Furthermore, depending on the assembly 0, in such connectors without protection, water can get into an electrical connection system with which the connector is associated. That is to say additional sealing is required for protection from standing water. Furthermore, CDC sheet metal screws generate metal dust which is created during mounting/demounting of the connector and may lead to large problems in an electrical connector. These problems are solved using the shield contact adapter 20 of the assembly connector 1.

Figure 1:
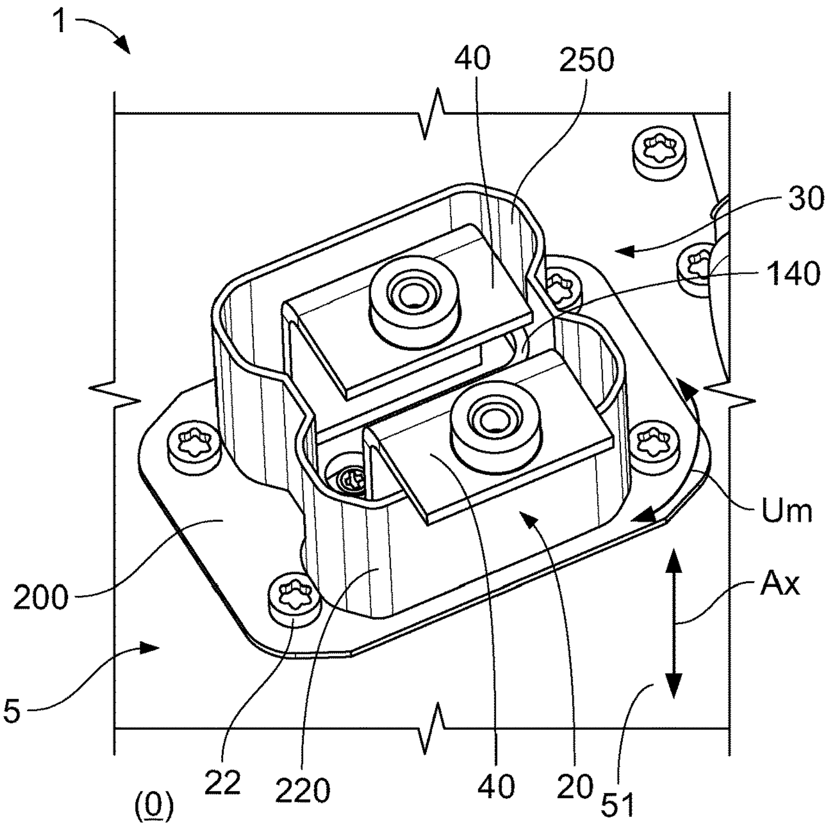
FIG. 1 shows a perspective inner plan view of an assembly connector with a shield contact adapter, which is installed on and in an assembly wall of an assembly of a vehicle in accordance with an exemplary embodiment.
Figure 2:
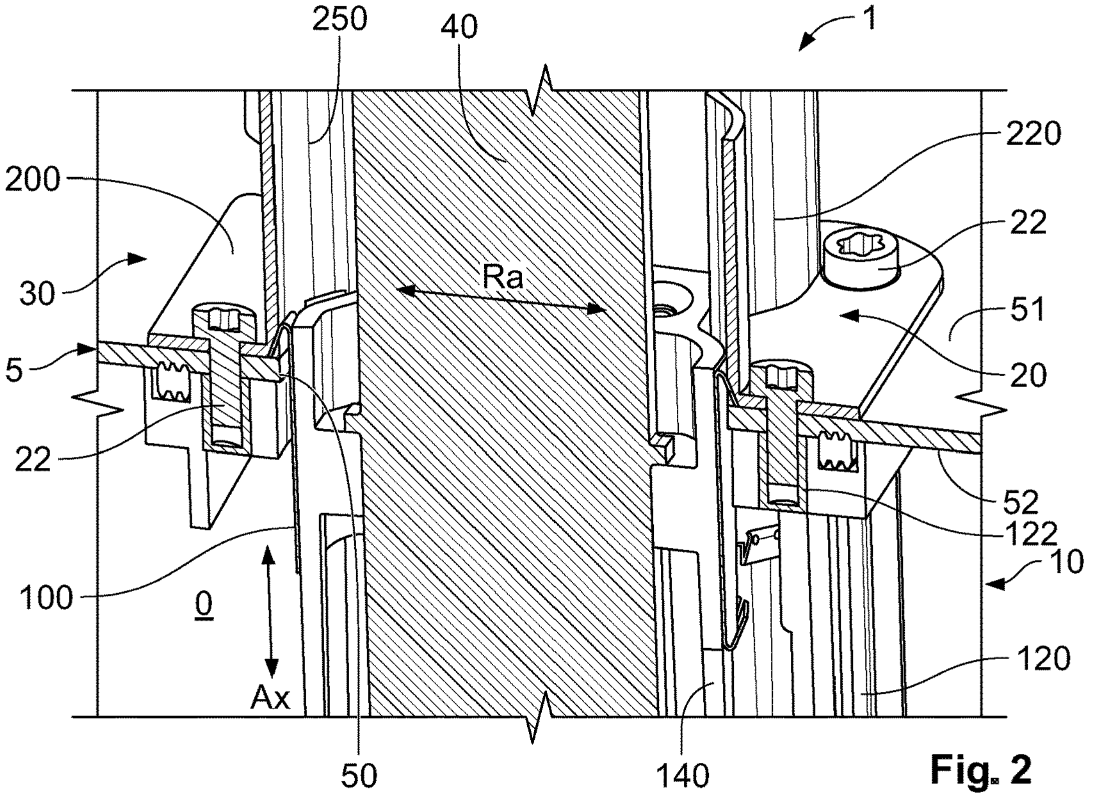
FIG. 2 shows a perspective sectional view of an assembly connector with a shield contact adapter, which is installed on and in an assembly wall of an assembly of a vehicle in accordance with an exemplary embodiment.

FIGS. 1 and 2 show the assembly connector 1 installed on and in an assembly wall 5. Here, the assembly connector 1 is installed both internally in (cf. FIG. 1) and externally on (cf. FIGS. 1 and 2) the assembly 0, wherein the assembly connector 1 extends through a connector through-cutout 50 in the assembly wall 5. That is to say on the one hand a section 30 of the assembly connector 1 on the inner side of the assembly is arranged on an inner side 51 of the assembly wall 5 internally in the assembly 0, and on the other hand a section 10 of the assembly connector 1 on the outer side of the assembly is arranged on an outer side 52 of the assembly wall 5 externally on the assembly 0.

Figure 3:
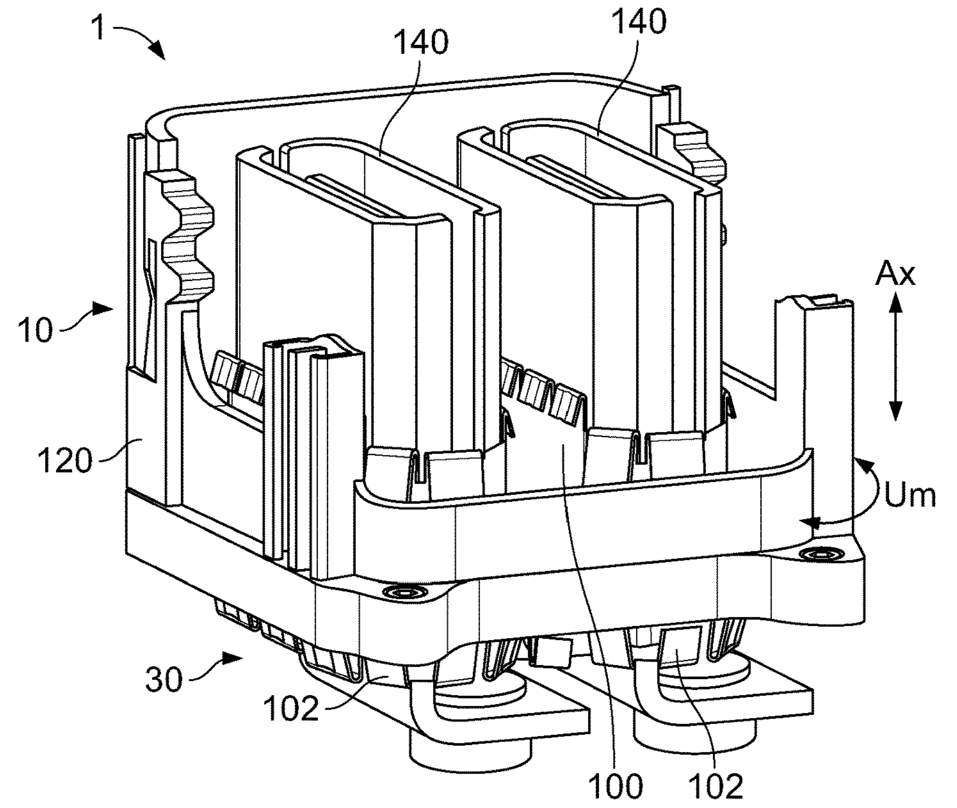
FIG. 3 shows an assembled assembly connector without its shield contact adapter in perspective views in accordance with an exemplary embodiment.

The assembly connector 1 leads in the present case from the outside inwardly into the assembly 0 or vice versa, wherein other configurations, e.g., completely internally in an assembly, are of course likewise possible. Only the assembly connector 1 can be or is installed on and in the assembly wall 5.—The assembly connector 1 (cf. also FIGS. 3, 5 and 6) comprises a housing 120 or an outer housing 120 substantially in the section 10 on the outer side of the assembly, in which housing or outer housing contact receptacles 140 can be arranged in accordance with a number of electrical contacts 40 of the assembly connector 1. Here, the contact receptacles 140 of an individual assembly connector 1 can be formed together in one piece and in particular integrally or in multiple pieces.

In the mounted state of the assembly connector 1 (cf. in particular FIG. 2) a contact 40 is arranged, possibly in a sealed manner, in the relevant contact receptacle 140, which contact 40 is in turn secured by the contact receptacle 140 or is fastened in the same. The contact 40 may be a busbar, a blade contact, a terminal, a pin, a socket, a spring beam contact, a tuning fork contact, or another type of electrical contact. The contact receptacles 140 are for their part arranged, possibly in a sealed manner, in the housing 120 or outer housing 120 and are secured by the same or are fastened in the same.

Figure 4:
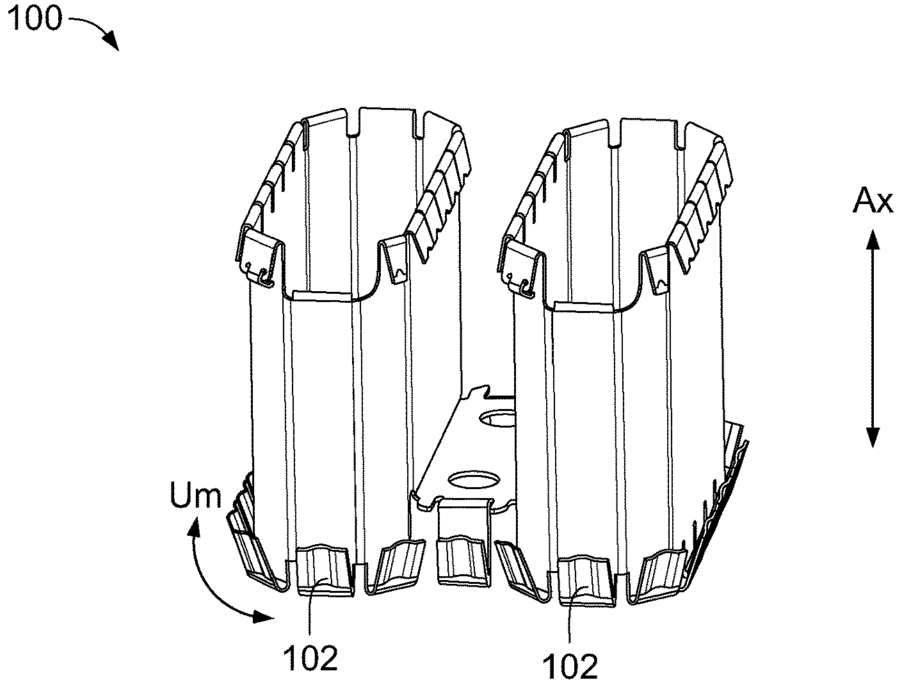
FIG. 4 shows a connector shield of the assembly connector alone in perspective views in accordance with an exemplary embodiment.

A connector shield 100 (cf. also FIG. 4), which is formed materially in one piece or integrally externally in the radial direction Ra, is provided on the contact receptacles 140, which connector shield extends from the section 10 of the assembly connector 1 on the outer side of the assembly through the connector through-cutout 50 to the section 30 of the assembly connector 1 on the inner side of the assembly or vice versa. In the section 10 on the outer side of the assembly, the connector shield 100 can be contacted electrically by a shield of an electrical conductor (cable, busbar, etc.) which can be connected to the assembly connector 1 there. For this, the connector shield 100 can comprise electrical contact lugs, particularly spring contact lugs.

In the present case, the connector shield 100 comprises a shield contact sleeve for each contact 40, which runs around the same completely in the peripheral direction thereof. A shape of the shield contact sleeve is adapted to a shape of the contact 40 in this case. The illustrated connector shield 100 comprises two such shield contact sleeves, which are arranged substantially parallel to one another, which shield contact sleeves are preferably integrally connected to one another via a web. The web can be formed in such a manner (through-cutouts) that the connector shield 100 can be secured or fastened in the assembly connector 1 therewith.

Internally in the assembly 0, the electrical shield ends or the electrical shield of the assembly connector 1 requires an electrical connection to an assembly wall 5, which is possibly coated in an electrically insulated manner. Here, in the section 30 on the inner side of the assembly, the connector shield 100 is electrically directly contacted by the shield contact adapter 20 (cf. in particular also FIGS. 7 and 8), which for its part is in direct or indirect electrical contact with an electrically conductive layer of the assembly wall 5.

The direct electrical contact of the connector shield 100 with the shield contact adapter 20 takes place by means of electrical contact lugs 102 of the connector shield 100, which are formed as spring contact lugs 102 in particular. It is of course alternatively or also additionally possible, analogously to provide contact lugs or spring contact lugs on the shield contact adapter 20 (not illustrated). In the present case, the connector shield 100 and the shield contact adapter 20 are formed and arranged in the assembly connector 1 in such a manner that the contact lugs 102 of the connector shield 100 electrically contact the shield contact adapter 20 on a radial Ra inner side of the shield contact adapter 20 (cf. FIGS. 2, 5 and 6).

For the direct electrical contact of the shield contact adapter 20 with the assembly wall 5, the shield contact adapter 20 may comprise coating opening devices (not illustrated), by means of which a coating of the assembly wall 5 can be opened. For example, the coating opening devices may be barbs, cutting surfaces, scrappers, a knurled surface, and the like. As a result, the electrically conductive layer of the assembly wall 5 can be electrically contacted by the shield contact adapter 20 (axial pressing areas, cf. above).

Alternatively or additionally, the indirect electrical contact of the shield contact adapter 20 with the assembly wall 5 or the electrically conductive layer thereof can be produced via at least one fastening means 22 (cf. FIGS. 5 and 6) of the shield contact adapter 20 (hollow cylindrical contacts, cf. above). Here, the shield contact adapter 20 is fastened by means of the fastening means 22 to the assembly wall 5. Such a fastening means 22 can be formed e.g., as a rivet, particularly an SPR rivet, a screw, etc.

Furthermore, alternatively or additionally, an indirect electrical contact of the shield contact adapter 20 with the assembly wall 5 can be produced via a mounting bush 122 of the housing 120 or outer housing 120. That is to say, the shield contact adapter 20 contacts the fastening means 22, the fastening means 22 contacts the mounting bush 122 and the mounting bush 122 contacts the assembly wall 5 electrically in each case.

Figure 5:
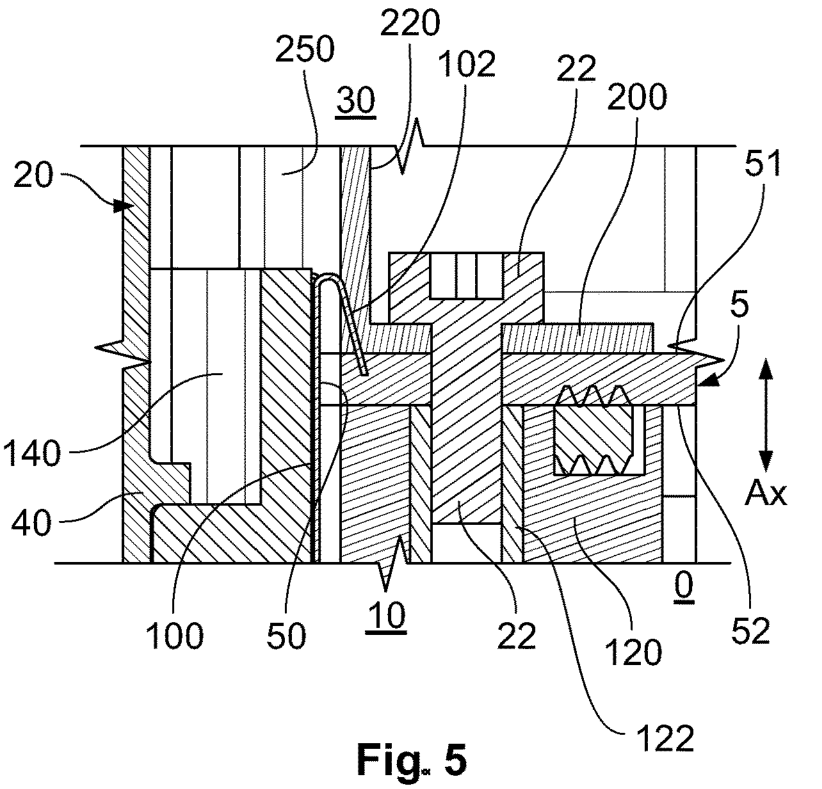
FIG. 5 shows in 2D sectional views which are broken away on all sides, two embodiments of the installed assembly connector in the region of its electrically conductive connections between the connector shield and an electrically conductive layer of the assembly wall in accordance with an exemplary embodiment.
Figure 6:
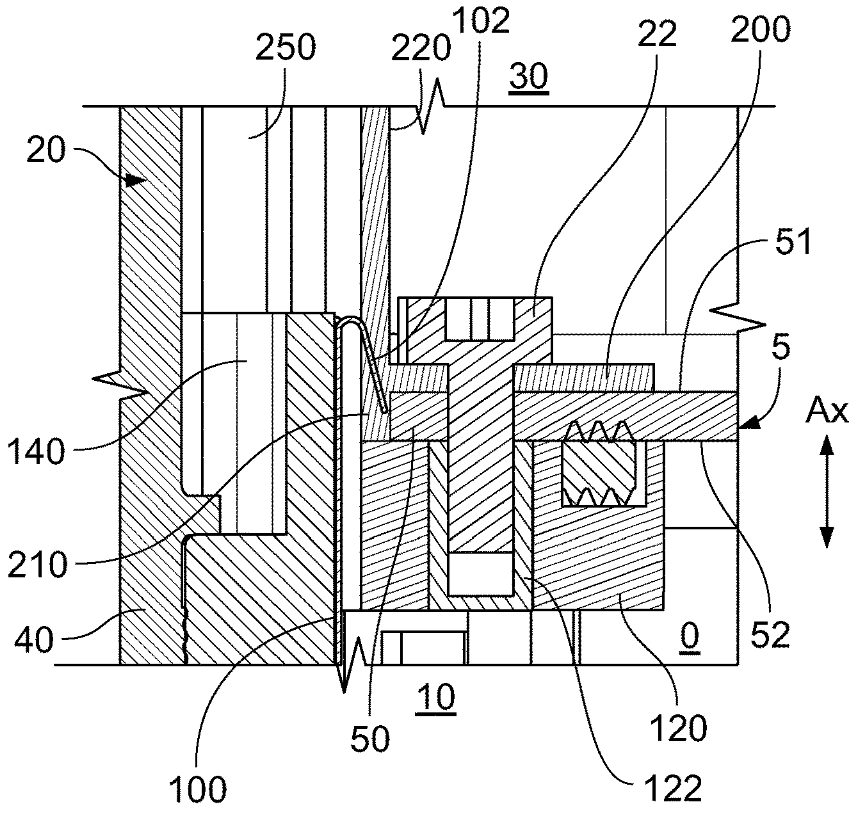
FIG. 6 shows in 2D sectional views which are broken away on all sides, two embodiments of the installed assembly connector in the region of its electrically conductive connections between the connector shield and an electrically conductive layer of the assembly wall in accordance with an exemplary embodiment.

The illustrated shield contact adapter 20 (cf. FIGS. 7 and 8 in particular) comprises at least one plate-shaped base 200, by means of which it can be fastened to the assembly wall 5 by means of the fastening means 22 (cf. FIGS. 5 and 6 in particular). Furthermore, the shield contact adapter 20 comprises a connection through-cutout 250, in which the section 30 of the assembly connector 1 on the inner side of the assembly can be or is provided. This represents a basic embodiment of the shield contact adapter 20 (cf. FIG. 8 without centering ring 210).

In the installed state of the assembly connector 1 on and in the assembly wall 5, the spring contact lugs 102 of the connector shield 100 contact the shield contact adapter 20 in the radial direction Ra internally in the shield contact adapter 20, that is to say internally in the connection through-cutout 250. The spring contact lugs 102 of the connector shield 100 deflect in the radial direction Ra in this case. Here, a contact region runs internally around the connection through-cutout 250 in the peripheral direction Um substantially completely, as a result of which an electrical peripheral contact is formed For simple mounting of the shield contact adapter 20 on/over the connector through-cutout 50 on the assembly wall 5, the shield contact adapter 20 may comprise a centering ring 210 or a functionally identical device, which can be fitted into the connector through-cutout 50 in a formfitting manner at least in sections. The centering ring 210 or the functionally identical device projects in this case somewhat in the axial direction Ax from the plate-shaped base 200 and runs preferably completely around the plate-shaped base 200 in the peripheral direction Um. Radially Ra internally, the centering ring 210 or the functionally identical device also constitutes the connection through-cutout 250.

Furthermore, the shield contact adapter 20 may comprise a peripheral wall 220, which—if the centering ring 210 is present—is arranged on the side of the plate-shaped base 200 opposite the same. This apron makes it possible that, in the case of a liquid-tight connection between the assembly wall 5 and the shield contact adapter 20, no water or a different liquid located on the assembly wall 5 can make it radially internally into the shield contact adapter 20 and from there into the assembly connector 1. The peripheral wall 220 projects in this case in the axial direction Ax from the plate-shaped base 200 and runs completely around the plate-shaped base 200 in the peripheral direction Um. Radially Ra internally, the peripheral wall 220 also constitutes the connection through-cutout 250.

If both the centering ring 210 and the peripheral wall 220 are arranged on the mutually opposite large-area sides of the plate-shaped base 200, then the same may be flush in the axial direction Ax or not. If appropriate, the peripheral wall 220 may comprise a somewhat larger or a somewhat smaller perimeter than the centering ring 210.—Here, the shield contact adapter 20 is formed as a closed apron-like (cf. FIG. 7) or closed ring-shaped (cf. FIG. 8) three-dimensionally structured component.

The shield contact adapter 20 can be formed for a single assembly connector 1 or for a plurality of assembly connectors 1, e.g., two assembly connectors 1. In the second case, the shield contact adapters 20 for the plurality of assembly connectors 1 can be combined to form a combined shield contact adapter plate (not illustrated). That is to say these shield contact adapters 20 share a single plate-shaped base 200, which comprises a corresponding number of connection through-cutouts 250 and possibly a corresponding number of centering rings 210 and/or peripheral walls 220. Here, it is possible to provide only one single centering ring 210.

The integration of the shield contact adapter 20 into the assembly connector 1 leads to an electrically radially Ra contactable surface for the connector shield 100 or the contact lugs 102 thereof. Here, the connector shield 100 can remain the same, i.e. a connector shield 100, which has previously electrically contacted an assembly wall, then contacts the shield contact adapter 20. The shield contact adapter 20 may be a component consisting of diecast aluminum in particular. In addition, the shield contact adapter 20 can be configured as protection from water, particularly standing water, e.g., in the case of a leak. The mechanical and possibly also the electrical connection between the shield contact adapter 20 and the assembly wall 5 can be realized with the technology which a user already uses.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical assembly connector for an assembly of a vehicle, the electrical assembly connector comprising:

a housing having a contact receptacle, the housing configured to be received in a connector through-cut in an assembly wall of the assembly, the housing having an inner section arranged at an inner side of the assembly wall, the housing having an outer section arranged at an outer side of the assembly wall;

a contact held in the contact receptacle of the housing;

a connector shield coupled to the housing and surrounding at least part of the contact receptacle, the connector shield extending along at least a portion of the inner section and at least a portion of the outer section of the housing such that the connector shield is configured to pass through the connector through-cut in the assembly wall, the connector shield being electrically conductive; and a shield contact adapter coupled to the housing, the shield contact adapter being electrically connected to the connector shield, the shield contact adapter having a connection configured to form an electrically conductive connection with an electrically conductive layer of the assembly wall such that the shield contact adapter electrically connects the connector shield to the electrically conductive layer of the assembly wall.

2. The electrical assembly connector according to claim 1, wherein the housing is configured to be installed on and in the assembly wall.

3. The electrical assembly connector according to claim 1, wherein the connector shield is configured to pass through the connector through-cut in the assembly wall such that a portion of the connector shield is at the inner side of the assembly wall and a portion of the connector shield is at the outer side of the assembly wall.

4. The electrical assembly connector according to claim 1, wherein the shield contact adapter is configured to pass at least partially through the connector through-cut in the assembly wall.

5. The electrical assembly connector according to claim 1, wherein the shield contact adapter includes a base configured to be mounted to an inner side of the assembly wall and a peripheral wall extending from the base, the peripheral wall surrounding a periphery of the housing, the connector shield being directly electrically connected to at least one of the base and the peripheral wall.

6. The electrical assembly connector according to claim 5, wherein the shield contact adapter includes a centering ring extending from the base opposite the peripheral wall, the centering ring configured to be received in the connector through-cut to engage the connector through-cut and position the shield contact adapter relative to the assembly wall.

7. The electrical assembly connector according to claim 1, wherein the electrically conductive connection of the connector shield to the electrically conductive layer of the assembly wall includes a direct electrical contact of the connector shield with the shield contact adapter and includes one of a direct or indirect electrical contact of the shield contact adapter with the electrically conductive layer of the assembly wall.

8. The electrical assembly connector according to claim 1, wherein the connector shield includes a plurality of spring contact lugs directly electrically connected to the shield contact adapter.

9. The electrical assembly connector according to claim 1, wherein the shield contact adapter is one of directly electrically connected to the electrically conductive layer of the assembly wall by coating opening devices on the shield contact adapter or indirectly electrically connected to the electrically conductive layer of the assembly wall by a fastener that fastens the shield contact adapter to the assembly wall.

10. The electrical assembly connector according to claim 1, wherein the electrically conductive connection of the connector shield via the shield contact adapter to the electrically conductive layer of the assembly wall includes a substantially peripheral electrical peripheral contact element formed in a peripheral direction between the connector shield and the shield contact adapter, wherein the peripheral contact element includes a multiplicity of individual electrical contacts forming intermittent contact points with the electrically conductive layer of the assembly wall.

11. The electrical assembly connector according to claim 1, wherein the electrically conductive connection of the connector shield via the shield contact adapter to the electrically conductive layer of the assembly wall includes one of a multiplicity of axial pressing areas or a plurality of cylindrical contact elements running in the axial direction.

12. The electrical assembly connector according to claim 1, wherein the shield contact adapter is arranged around the connector through-cut in a liquid-tight manner with respect to the assembly wall.

13. A power-electrical assembly for a vehicle, the power electrical assembly comprising:

an assembly wall having an inner surface and an outer surface, the assembly wall having an electrically conductive layer, the assembly wall including a connector through cut passing through the assembly wall between the inner surface and the outer surface; and an electrical assembly connector coupled to the assembly wall, the electrical assembly connector including a housing having a contact receptacle holding a contact in the contact receptacle, the electrical assembly connector including an electrically conductive connector shield coupled to the housing and surrounding at least part of the contact receptacle, the electrical assembly connector including a shield contact adapter coupled to the housing, the housing includes an inner section arranged at an inner side of the assembly wall and an outer section arranged at an outer side of the assembly wall, the housing is received in the connector through-cut in the assembly wall, the shield contact adapter is electrically connected to the connector shield, the shield contact adapter having a connection forming an electrically conductive connection with the electrically conductive layer of the assembly wall such that the shield contact adapter electrically connects the connector shield to the electrically conductive layer of the assembly wall, wherein the connector shield extends along at least a portion of the inner section and at least a portion of the outer section of the housing such that the connector shield is configured to pass through the connector through cut in the assembly wall.

14. The power-electrical assembly according to claim 13, wherein the shield contact adapter is configured to pass at least partially through the connector through cut in the assembly wall.

15. The power-electrical assembly according to claim 13, wherein the shield contact adapter includes a base mounted to the inner surface of the assembly wall and a peripheral wall extending from the base, the peripheral wall surrounding a periphery of the housing, the connector shield being directly electrically connected to at least one of the base and the peripheral wall.

16. The power-electrical assembly according to claim 15, wherein the shield contact adapter includes a centering ring extending from the base opposite the peripheral wall, the centering ring configured to be received in the connector through cut to engage the connector through cut and position the shield contact adapter relative to the assembly wall.

17. The power-electrical assembly according to claim 13, wherein the electrically conductive connection of the connector shield to the electrically conductive layer of the assembly wall includes a direct electrical contact of the connector shield with the shield contact adapter and includes one of a direct or indirect electrical contact of the shield contact adapter with the electrically conductive layer of the assembly wall.

18. The power-electrical assembly according to claim 13, wherein the connector shield includes a plurality of spring contact lugs directly electrically connected to the shield contact adapter.

19. The power-electrical assembly according to claim 13, wherein the shield contact adapter is one of directly electrically connected to the electrically conductive layer of the assembly wall by coating opening devices on the shield contact adapter or indirectly electrically connected to the electrically conductive layer of the assembly wall by a fastener that fastens the shield contact adapter to the assembly wall.

20. The power-electrical assembly according to claim 13, wherein the shield contact adapter is arranged around the connector through cut in a liquid-tight manner with respect to the assembly wall.

* * * * *